US011252529B2

(12) United States Patent
Bizzarri et al.

(10) Patent No.: US 11,252,529 B2
(45) Date of Patent: Feb. 15, 2022

(54) METHOD AND SYSTEM FOR TRAFFIC ANALYSIS

(71) Applicant: TELECOM ITALIA S.p.A., Milan (IT)

(72) Inventors: Simone Bizzarri, Turin (IT); Giorgio Ghinamo, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/734,090

(22) PCT Filed: Jun. 19, 2019

(86) PCT No.: PCT/EP2019/066207
§ 371 (c)(1),
(2) Date: Dec. 1, 2020

(87) PCT Pub. No.: WO2020/002094
PCT Pub. Date: Jan. 2, 2020

(65) Prior Publication Data
US 2021/0227347 A1 Jul. 22, 2021

(30) Foreign Application Priority Data
Jun. 29, 2018 (IT) .......................... 102018000006796

(51) Int. Cl.
*H04W 4/021* (2018.01)
*H04W 4/029* (2018.01)
(52) U.S. Cl.
CPC ........... *H04W 4/021* (2013.01); *H04W 4/029* (2018.02)
(58) Field of Classification Search
CPC ..... H04W 4/029; H04W 4/022; H04W 16/04; H04W 24/08; H04W 36/22;
(Continued)

(56) References Cited
U.S. PATENT DOCUMENTS 9,357,553 B2 * 5/2016 Scarr ................. H04W 72/0486
10,278,015 B2 * 4/2019 Colonna ............... H04W 4/022
(Continued)

FOREIGN PATENT DOCUMENTS

WO  WO 2016/107646 A1    7/2016
WO  WO-2016107646 A1 *  7/2016 ............ H04W 4/029

OTHER PUBLICATIONS

Calabrese, F. et al., "Estimating Origin-Destination Flows Using Mobile Phone Location Data," IEEE Pervasive Computing, vol. 10, No. 4, Apr. 1, 2011, XP011385665, pp. 36-44.
(Continued)

*Primary Examiner* — Matthew C Sams
(74) *Attorney, Agent, or Firm* — Oblon, McClelland, Maier & Neustadt, L.L.P.

(57) ABSTRACT

A method includes predicting the number of users of user terminals gathering in a target area within a region on a first day. The method includes collecting records relating to user terminals positioning data, and partitioning a portion of the region of interest into an intermediate area surrounding the target area and an external area which surrounds the intermediate area. For each observation time slot, a first term indicative of the number of user terminals moving from the external area to the intermediate area are calculated during said observation time slot based, a second term indicative of user terminals which, during a reference day preceding the first day, moved from the external area to the intermediate area is calculated, and the difference between said first term and said second term is calculated. The number of new user terminals which entering the target area is predicted based on the difference.

11 Claims, 3 Drawing Sheets

(58) Field of Classification Search
CPC . H04W 72/0486; H04W 4/021; H04W 4/027; G06Q 30/02; G06Q 30/0261; G06Q 30/0267; G06Q 30/0269; H04L 67/22; H04L 67/26; H04L 67/306; G06F 17/18
See application file for complete search history.

(56) References Cited

U.S. PATENT DOCUMENTS

| | | | |
|---|---|---|---|
| 2013/0183996 A1* | 7/2013 | Scarr | H04W 16/04 |
| | | | 455/453 |
| 2017/0147925 A1* | 5/2017 | Bostick | H02K 5/124 |
| 2017/0353830 A1* | 12/2017 | Colonna | H04W 4/029 |
| 2018/0310123 A1* | 10/2018 | Deluca | H04L 67/22 |
| 2019/0043061 A1 | 2/2019 | Hotori et al. | |

OTHER PUBLICATIONS

International Search Report and Written Opinion dated Oct. 24, 2019 in PCT/EP2019/066207 filed on Jun. 19, 2019.

\* cited by examiner

METHOD AND SYSTEM FOR TRAFFIC ANALYSIS

BACKGROUND OF THE PRESENT INVENTION

Field of the Present Invention

The present invention generally relates to the traffic analysis field. More particularly, the present invention relates to a method and system aimed at identifying and predicting variations in the geographical density of physical entities (e.g., people) moving in a geographic region of interest (e.g., a urban area) when gatherings of such physical entities are caused by the occurrences of public happenings.

Overview of the Related Art

In order to carry out traffic analysis relating to flows of people in a geographic area of interest (hereinafter briefly referred to as "region of interest"), it is known to exploit data exchanged between wireless user terminals (e.g., smartphones) carried by said people (hereinafter referred to as "user") and base stations of a wireless communication network (e.g., a Long-Term Evolution (LTE) network or a 5G network) pertaining to said region of interest.

The tracking of the cell identifier (cell ID) which identifies the cell of the wireless communication network wherein network events (e.g., voice calls, data transmission, periodic updating) are carried out can be advantageously exploited for traffic analysis purposes. For this purpose, it is useful to take advantage of the network database containing information about the geographic positions of the various cells of the wireless communication network (e.g., the position of the corresponding base stations and the associated cell coverage).

Making reference to an LTE wireless communication network, it is possible to use the known user location detection procedure referred to as Minimization of Drive Test (MDT) in order to track the position and movement of users. The MDT procedure provides that wireless communication network periodically reads the Global Navigation Satellite System (GNSS) (e.g. Global Positioning System (GPS), GLONASS, Galileo) position of the user terminals which are connected to the wireless communication network itself, obtaining thus information about the locations and movements of the users. When a user is located in a place wherein the GNSS position of his/her user terminal is not available (e.g., when the user is inside a building), or the GNSS functionality is disabled the MDT procedure is able to determine the location of a user by measuring the radio signal of the user terminal.

Publication "*Wireless Internet Handbook, Technologies, Standards, and Applications*" by Borko Furht and Mohammad Ilyas, Auerbach Publications, 2003, discloses a stochastic method for predicting the movement of user terminals (and therefore, of the user themselves) connected to a wireless communication network. This method is based on the idea that if a user terminal has moved from a first location x1 to a second location x2, its destination location xx may be statistically predicted by observing the sequence of locations of other user terminals that have passed by locations x1 and x2 in a recent past and in the same mobility conditions. A stochastic method of this kind can be efficiently employed only if stationary stochastic processes are used. However, this condition is not verified in case of public happenings—such as artistic/entertaining performances, cultural exhibitions, theatrical plays, sport contests, concerts, movies, demonstrations, . . . —which provide for the formation of a gathering of a certain number of users in a certain location which generates user traffic flows that overlap with the usual user traffic in standard conditions (i.e., in absence of happenings).

It is known to describe the movements of user terminals of a wireless communication network through the so-called Origin-Destination (O-D) matrices. Since it is based on statistical calculations, traffic analysis needs a large amount of empirical data to be collected both in respect of the region of interest and in respect of a selected observation period (e.g., 24 hours). These data are thus collected in O-D matrices based upon a partitioning of both the region of interest and observation period.

For partitioning the region of interest, the area is subdivided into a plurality of zones, each zone being defined according to several parameters such as for example, authorities in charge of the administration of the zones (e.g., a municipality), typology of land lots in the area of interest (such as open space, residential, agricultural, commercial or industrial lots) and physical barriers (e.g., rivers) that can hinder traffic (physical barriers can be used as zone boundaries). The size of the zones in which the region of interest can be subdivided, and consequently the number of zones, is proportional to the level of detail requested for the traffic analysis (i.e., city districts level, city level, etc.).

As well, the observation period can be subdivided into one or more time slots, with each time slot that may be defined according to known traffic trends, such as for example peak traffic hours corresponding to when most users travel to their workplace and/or travel back to home. The length of the time slots (and thus their number) is proportional to the level of detail requested for the traffic analysis over the considered observation period.

In this context, each entry of a generic O-D matrix comprises the number of user terminals moving from a first zone (origin) to a second zone (destination) of the region of interest. Each O-D matrix corresponds to one time slot out of the one or more time slots in which the considered observation period can be subdivided. In order to obtain a reliable traffic analysis, sets of O-D matrices should be computed over a plurality of analogous observation periods and should be combined so as to obtain O-D matrices with a higher statistical value. For example, empirical data regarding the movements of user terminals should be collected over a number of (consecutive or not) days (each corresponding to a different observation period), and for each day a corresponding set of O-D matrices should be computed.

Patent EP3031043B1 by the same applicant of this patent application provides for calculating O-D matrices by processing data of the wireless communication network Paper "*Estimating Origin-Destination Flows Using Mobile Phone Location Data*" by Calabrese et al., IEEE Pervasive, pages 36-44, October-December 2011 (Vol. 10, No. 4) discloses other methods for generating O-D matrices.

Patent application EP3046289 discloses to supply automatic configuration systems of the wireless communication network (Self Organizing Network, "SON") using information about the distribution of user terminals obtained by the wireless communication network. This information is provided to a network simulator to be used for defining wireless communication network configuration parameters.

U.S. Pat. No. 9,392,471 discloses a network configuration solution based on performance parameters of the wireless communication network and based on the user terminals tracking by means of geolocation information thereof.

SUMMARY OF THE PRESENT INVENTION

Applicant has observed that the methods for generating O-D matrices disclosed in EP3031043 and in paper "*Estimating Origin-Destination Flows Using Mobile Phone Location Data*" are based on end-to-end movements of users among zones of cities, without any particular focus on real time traffic flows.

EP3031043 discloses setting, in a considered time slot, the starting location of a user terminal to the last location the user terminal had before the beginning of the time slot, and setting the destination location of the user terminal to the last location the user terminal had before the end of the time slot. Using intermediate locations are also contemplated.

The solutions disclosed in EP3046289 and in U.S. Pat. No. 9,392,471 use only data made available by the wireless communication network without any particular processing directed to prediction.

In view of the above, Applicant has devised an improved method (and a corresponding system) for predicting the number of people gathering in an area for attending a public happening which exploits real time data regarding traffic flows.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present that applies mutatis mutandis to any other aspect thereof).

An aspect of the present invention relates to a method, implemented by a system coupled with a wireless communication network.

According to an embodiment of the present invention, the method comprises predicting the number of users of user terminals gathering in a target area within a region of interest for attending a public happening occurring in a first day.

According to an embodiment of the present invention, said region of interest is under radio coverage by said wireless communication network.

According to an embodiment of the present invention, said predicting comprises performing the following operations during said first day:
 collecting, from the wireless communication network, records relating to user terminals positioning data;
 partitioning a portion of the region of interest into an intermediate area surrounding the target area and into an external area which surrounds the intermediate area;
 for each observation time slot of a plurality of observation time slots of said first day, calculating a first term indicative of the number of user terminals which are moving from the external area to the intermediate area during said observation time slot based on the collected records;
 for each observation time slot, calculating a second term indicative of the number of user terminals which, during a corresponding reference time slot of a reference day preceding in time said first day, moved from the external area to the intermediate area, said calculating the second term being based on records which were collected during said reference day,
 for each observation time slot, calculating the difference between said first term and said second term;
 for each observation time slot, predicting the number of new user terminals which will enter in the target area for attending the public happening in a forthcoming period subsequent to said observation time slot based on said calculated difference.

According to an embodiment of the present invention, said collecting, from the wireless communication network, records relating to user terminals positioning data comprises collecting at least one between network events records and GNSS records.

According to an embodiment of the present invention, each network event record provides geographical position data of a user terminal involved in a corresponding network event.

According to an embodiment of the present invention, each GNSS record contains GNSS position of a user terminal.

According to an embodiment of the present invention, said calculating the difference comprises calculating the difference between:
 a first term indicative of the number of user terminals which are moving from the external area to the intermediate area minus the number of user terminals which are moving from the intermediate area to the external area during said observation time slot based on the collected records;
 a second term indicative of the number of user terminals which moved from the external area to the intermediate area minus the number of user terminals which moved from the intermediate area to the external area during said reference time slot of the reference day.

According to an embodiment of the present invention, each network event is an interaction between a user terminal and the wireless communication network, said interaction comprising at least one among:
 an interaction at power on/off of the user terminal;
 an interaction at incoming/outgoing voice calls;
 an interaction at sending/receiving SMS from/o the user terminal;
 an interaction at Internet access by the user terminal;
 an interaction at a generic data transfer between the user terminal and the wireless communication network.

According to an embodiment of the present invention, said reference day is a day during which the density of users and the flows thereof in the region of interest had a statistical behavior similar to that expected for the first day deprived of contributions due to the public happening occurrence.

According to an embodiment of the present invention, said reference day is a day during which the density of users and the flows thereof in the region of interest is substantially comparable to that expected for the first day.

According to an embodiment of the present invention, the method further comprises
 calculating an average public happening attendance time by estimating the time period during which records have been collected when the corresponding user terminals were located in the target area;
 forecasting a public happening leaving rate based on said calculated public happening attendance time.

According to an embodiment of the present invention, the method further comprises setting up services to be provided to users in the target area based on said predicted number of users.

According to an embodiment of the present invention, said setting up services to be provided to users in the target area comprises at least one among:

configuring the wireless communication network in terms of radio resource availability in a way that is proportional to said predicted number of users;

alerting a public security system to intervene for safeguarding the target area in a way that is proportional to said predicted number of users; and strengthening a public transportation system from/to the target area in a way that is proportional to said predicted number of users.

A further aspect of the present invention relates to a system coupled with a wireless communication network, comprising a computation engine unit configured to predict the number of users of user terminals gathering in a target area within a region of interest for attending a public happening occurring in a first day.

According to an embodiment of the present invention, said region of interest is under radio coverage by said wireless communication network.

According to an embodiment of the present invention said computation engine is configured to carry out the following operations during said first day:

collecting, from the wireless communication network, records relating to user terminals positioning partitioning a portion of the region of interest into an intermediate area surrounding the target area and into an external area which surrounds the intermediate area;

for each observation time slot of a plurality of observation time slots of said first day, calculating a first term indicative of the number of user terminals which are moving from the external area to the intermediate area during said observation time slot based on the collected records;

for each observation time slot, calculating a second term indicative of the number of user terminals which, during a corresponding reference time slot of a reference day preceding in time said first day, moved from the external area to the intermediate area, said calculating the second term being based on records which were collected during said reference day, for each observation time slot, calculating the difference between said first term and said second term;

for each observation time slot, predicting the number of new user terminals which will enter in the target area for attending the public happening in a forthcoming period subsequent to said observation time slot based on said calculated difference.

According to an embodiment of the present invention, the system further comprises a repository unit configured to memorize the records collected during the first day and during the reference day.

DETAILED DESCRIPTION OF EXEMPLARY AND NON-LIMITATIVE EMBODIMENTS OF THE PRESENT INVENTION

Figure 1:
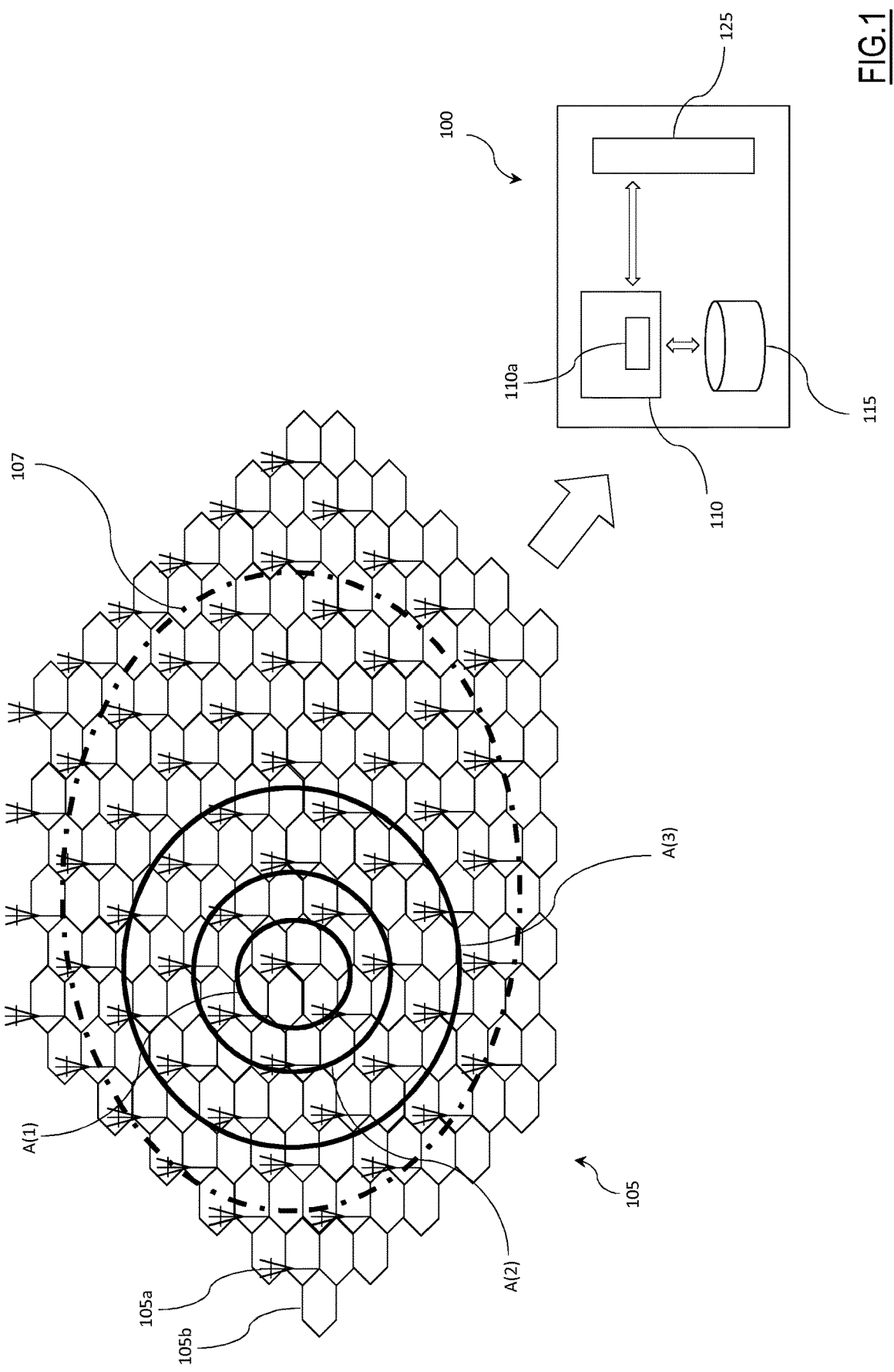
FIG. 1 is a schematic representation of a system 100 for analyzing traffic in a region of interest according to an embodiment of the present invention.

With reference to the drawings, FIG. 1 is a schematic representation of a system 100 for analyzing traffic directed to predict the number of persons gathering in a region of interest for attending a public happening according to an embodiment of the present invention.

In the present description, by "public happening" it is intended any kind of event capable of causing the formation of gatherings of people in a certain location. A public happening may belong to the most disparate nature, such as for example (and non-exhaustively) artistic/entertaining performances, cultural exhibitions, theatrical plays, sport contests, concerts, movies, demonstrations, and so on.

The system 100 is coupled to a wireless communication network 105, such as a (2G, 3G, 4G, 5G or higher generation) mobile telephony network, and is configured for receiving from the wireless communication network 105 positioning data records of user terminals (not shown, such as for example smartphones) carried by people (hereinafter, "users") located in a geographic region of interest, schematized in FIG. 1 as the area within the dash-and-dot line 107 (e.g., a city or town of village, a district of a city or town or village, a shopping area, a nightlife area etc.).

The wireless communication network 105 comprises a plurality of (three or more) base stations 105a geographically distributed through the region of interest 107. Each base station 105a is adapted to manage communication of user terminals in one or more served areas or cells 105b. In the example at issue, three cells 105b are served by each base station 105a, but similar considerations apply in case a different number of cells 105b is served by each base station 105a.

Each base station 105a of the wireless communication network 105 is adapted to interact with any user terminal located within one of the cells 105b served by such base station 105a. Such interactions between user terminals and wireless communication network 105 will be generally denoted as "network events", and may comprise (non exhaustively) interactions at power on/off, at incoming/outgoing voice calls, at sending/receiving SMS, at Internet access, at generic data transfers, etc.

The system 100 comprises a computation engine 110 configured to be adapted to process positioning data records retrieved from the wireless communication network 105, and a repository 115 (such as a database, a file system, etc.) configured to be adapted to store data regarding the positioning data records. For example, positioning data records can be occurred network events. Repository 115 can also be adapted to store computation results generated by the computation engine 110. and, possibly, any processing data generated by and/or provided to the system 100 (generally in a binary format). As will be described herein below, among the positioning data records retrieved from the wireless communication network 105 and stored in the repository, there are also the GNSS (e.g, GPS) positions of the user terminals carried by the users within the region of interest 107.

According to an embodiment of the present invention, the repository 115 further comprises historical data regarding user traffic in the region of interest 107 during past periods of time (e.g., regarding previous days). For example, as will be described in greater detail in the following of the description, such historical data comprise sequences of event records specifying the cell IDs of cells 105b wherein past network events occurred between each user terminal and the wireless communication network 105, or a subset of this information (e.g., pertaining to a subset of those network events).

Preferably, the system 100 comprises one or more input/output interfaces 125 (e.g., a user terminal, a software running on a remote terminal connected to the system 100) adapted to receive inputs from, and to provide outputs to a user of the system 100.

It should be appreciated that the system 100 may be implemented in any known manner; for example, the system 100 may comprise a single computer, or a network of distributed computers, either of physical type (e.g., with one or more main machines implementing the computation engine 110 and the repository 115, connected to other machines implementing the input/output interface 125) or of virtual type (e.g., by implementing one or more virtual machines in a computer network).

The system 100 is adapted to collect a network event record for each network event occurred between a user terminal and the wireless communication network 105 (through one of its communication stations 105a) within the region of interest 107. For example, each event record collected by the system 100 from the wireless communication network 105 comprises—in a non-limitative manner—an identifier of the user terminal that is involved in the corresponding network event (e.g., the user terminal identifier may be selected as one or more among the International Mobile Equipment Identity—IMEI, the International Mobile Subscriber Identity—IMSI and the Mobile Subscriber ISDN Number—MSISDN code, or an identifier made anonymous), time data (also denoted as timestamps) indicating the time at which the corresponding network event has occurred, and user terminal geographical position data, e.g., spatial indications based on the cell 105b in which the user terminal is located at the time of occurrence of the corresponding network event, as well as the cell ID of the cell 105b itself.

Making reference to an example in which the wireless communication network 105 is an LTE network, network event records associated with network events of a generic user terminal are generated by a Mobility Management Entity, or MME, comprised in the wireless communication network 105, which is responsible for a user terminal tracking and paging procedure in LTE networks.

In operation, network event records may be continuously retrieved by the system 100 from the wireless communication network 105. Alternatively, network event records may be collected by the system 100 periodically, e.g., for a predetermined time period (e.g., every certain number of minutes or hours).

The network event records retrieved from the wireless communication network 105 are stored in the repository 115, where they are made available to the computation engine 110 for processing.

Similarly, the system 100 is adapted to periodically receive from the wireless communication network 105 GPS records containing the GPS positions of user terminals (or RF signal strength measurements used for locating the terminal) within the region of interest 107 as a result of the previously mentioned MDT procedure. Also the GPS records are stored in the repository 115 for being made available to the computation engine 110 for processing.

The computation engine 110 is configured to carry out a procedure for analyzing traffic to identify and predict variations in the flow of users moving in the region of interest 107 when gatherings of users are caused by public happenings occurrences (hereinafter simply referred to as traffic analysis procedure) according to an embodiment of the present invention. Preferably, this procedure (described in detail in the following) is implemented by a software program product stored in a memory element 110a of the system 100, comprised in the computation engine 110 in the example of FIG. 1, even though the software program product could be stored in the repository 115 as well (or in any other memory element provided in the system 100).

The computation engine 110 is configured to provide the results of the traffic analysis procedure through the input/output interface 125, and optionally stores such results in the repository 115.

Figure 2:
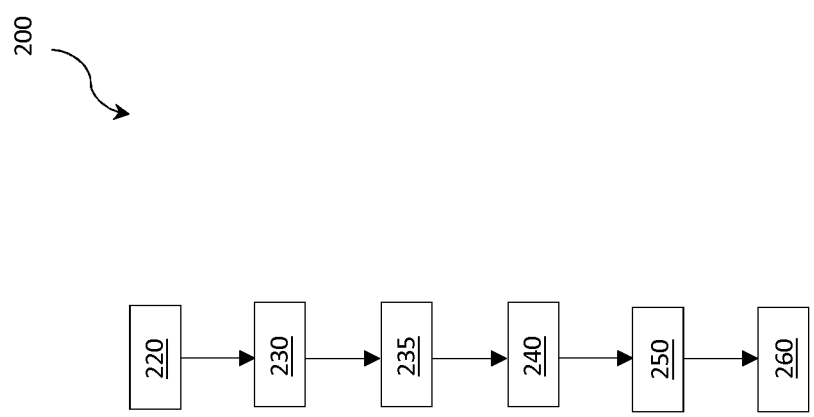
FIG. 2 illustrates in terms of functional blocks the main phases of a traffic analysis procedure carried out by the computation engine of the system of FIG. 1.

FIG. 2 illustrates in terms of functional blocks the main phases of the traffic analysis procedure 200 carried out by the computation engine 110 during a day (hereinafter referred to as "current day") in which a public happening is expected to occur according to an embodiment of the present invention.

While the phases of the traffic analysis procedure 200 which will be described in the following of the description are carried out, the computation engine 110 is also configured to concurrently monitoring the traffic of users within the region of interest 107. This monitoring is carried out by the computation engine 110 through the collection of network event records received from the wireless communication network 105 for each network event occurred between a user terminal and one of the communication stations 105a within the region of interest 107 and/or through the collection of GPS records periodically sent by the wireless communication network 105 through MDT procedure. For example, the position of each user terminal located within the communication network 105 can be identified by checking if the GPS records associated to that user terminal in the repository 115 contain the GPS position. If the GPS position of the user terminal is not available in any GPS record included in the repository 115, or in case the available GPS position corresponds to a not recent GPS record, the position of the user terminal is deduced by retrieving from the last received event records (stored in the repository 115) the indication of the cell 105b wherein a network event involving such user terminal is occurred. Moreover, using the MDT procedure it is possible to improve the precision of the location by processing power measures on RF signals of cells 105b reported by the user terminal.

The first phase of the traffic analysis procedure 200 provides for the computation engine 110 that identifies and locates the portion of the region of interest 107 wherein the public happening is expected to occur (block 220). This portion of the region of interest 107, is referred to as "target area". According to an embodiment of the present invention, the position of the target area is calculated by the computation engine 110 by exploiting the information regarding the user terminals position obtained through the collected network event records and/or GPS records. Alternatively, the position of the target area may be already known. The target area, identified in FIG. 1 with reference A(1), has a size which in general depends on the kind of the public happening that caused the increase of density of users.

The following phase provides for partitioning the portion of the region of interest 107 surrounding the identified target area A(1) into an intermediate area A(2) which surrounds the target area A(1) and an external area A(3) which surrounds the intermediate area A(2) (block 230).

For example, the target area A(1) may be schematized as a circular area having a radius of 100-400 meters.

Moreover, the intermediate area A(2) may have a radius which can range from 1 to 10 km (this value depends on the road and transportation conditions of the region of interest 107, e.g. it is based on the road/railway topology).

According to an exemplary embodiment of the present invention, the external area A(3) is an area having a radius such to comprise portions of the region of interest 107 wherein user terminals triggered the generation of a network event or a MDT procedure when they are presumably moving toward the target area A(1).

It has to be appreciated that the exemplary area size values mentioned above can be considered plausible in case the target area A(1) is located in an urban space. For example, in case the target area A(1) is located in a non-metropolitan zone, the intermediate area A(2) may have a radius higher than 10 Km in order to include the flows of users moving by train or by car.

As mentioned above, the computation engine 110 periodically collects network event records received from the wireless communication network 105 for each network event occurred between a user terminal and one of the communication stations 105a within the region of interest 107, and/or, in another service scenario, GPS records and/or RF signal strength measurements periodically sent by the wireless communication network 105 through the MDT procedure. According to an embodiment of the present invention, for each observation time slot OTS(t) having a time duration equal to or higher than the periodicity time with which network event and GPS records are collected (preferably between 10 and 15 minutes, e.g., 15 minutes), the computation engine 110 is configured to generate a corresponding O-D matrix M(t) relating to the user traffic flow among the areas A(1), A(2), A(3) (block 235). According to an embodiment of the present invention, the generation of the O-D matrixes M(t) is carried out using the data contained in the network event records and/or GPS records collected during the corresponding observation time slot OTS(t).

According to an embodiment of the present invention, the O-D matrix M(t) corresponding to the t-th observation time slot OTS(t) generated by the computation engine 110 is a square matrix having three rows i=1, 2, 3 and three columns j=1, 2, 3. Each row is associated with a corresponding area A(i) (i=1, 2, 3) among the target area A(1), the intermediate area A2 and the external area A3. In the same way, each column is associated with a corresponding area A(j) (j=1, 2, 3) among the target area A(1), the intermediate area A(2) and the external area A(3). Each i-th row represents an origin area for traffic flows of users while each j-th column represents a destination zone for traffic flows of users. In other words, as illustrated hereinbelow, the generic element m(i,j) of the O-D matrix M(t) represents the number of traffic flows (e.g., moving user terminals) starting in the area A(i) (origin area) and ending in the area A(j) (destination area) in the corresponding observation time slot OTS(t).

| OTS(t) | A(1) | A(2) | A(3) |
|---|---|---|---|
| A(1) | m(1, 1) | m(1, 2) | m(1, 3) |
| A(2) | m(2, 1) | m(2, 2) | m(2, 3) |
| A(3) | m(3, 1) | m(3, 2) | m(3, 3) |

The main diagonal of the O-D matrix M(t), which comprises the elements m(i,j) having i=j (i.e., elements m(i,j) having the same area A(i=j) both as origin and destination area) represent the number of user terminals which reported the same position in the last observation time slot OTS(t) and in the previous one. These elements do not depict a movement between areas of the region of interest 107 i.e., such entries do not depict an actual traffic flow.

The concepts of the present invention can be also applied to the case in which, when an observation time slot OTS(t) is considered, also sub-time slots corresponding to shorter subdivisions of such observation time slot OTS(t) can be taken into account for calculating the number of traffic flows. Moreover, the concepts of the present invention can be also applied to the case in which, within an observation time slot OTS(t), different sub-time slots are considered for counting the starting area and the ending area of traffic flows. For example, traffic flows can be considered starting from a first area (e.g., the area A(3)) in a first sub-time slot and ending in a second area (e.g., the area A(2)) in a second, subsequent sub-time slot of the same observation time slot OTS(t).

According to an embodiment of the present invention, if during the time slot TS(i) no new network event record and/or no new GPS record are received for a generic user terminal, it is assumed that such user terminal remained in the same position it had during the last time a network event record or a GPS record pertaining to such user terminal was collected by the computation engine 110. Therefore, the contribution of these user terminals to the generation of the O-D matrix M(t) is given by such last network event record or GPS record pertaining to a previous time slot TS(i).

The O-D matrix M(t) generated by collecting the network event records and the GPS records during time slot TS(i) is indicative of a stochastic process describing the user terminals traffic flow (and, therefore, of users) among the three areas A(1), A(2), A(3).

As already mentioned in the introduction of the present document, by having a stochastic process describing the user terminals traffic flow among the three areas A(1), A(2), A(3) it is possible to statistically predict the movement of the user terminals with known predictive stochastic methods if such stochastic process is stationary. However, the presence of a public happening makes such stochastic process not stationary, because the flow of users directed toward the public happening varies over time, and therefore the probability that a user passes from an origin location to a destination location varies over time.

For this reason, according to an embodiment of the present invention, the (not stationary) stochastic process corresponding to the O-D matrix M(t) generated during the current day is made quasi-stationary by taking into account also the behavior of the user terminals traffic flow in a selected reference day preceding the current day.

According to an embodiment of the present invention, the reference day is a day (preceding in time the current day) during which the density of users and the flows thereof in the region of interest 107 had a statistical behavior similar to that of said current day deprived of contributions due to the public happening occurrence. In other words, the reference day is a day during which the density of users and the flows thereof in the region of interest 107 has a statistical behavior similar to the one said current day would have if said current day was instead a "standard" day during which no particular public happening is expected to occur.

For example, if the system 100 is operating during a working day (e.g., a Tuesday), a possible choice for the reference day may be a previous working day (e.g., the Tuesday of the previous week). Indeed, the average density of users and the flows thereof during working days may be assumed to be very similar. If instead the system is operating during a weekend day (e.g., Saturday), a better choice for the reference day could be a previous weekend day (e.g., the Saturday of the previous week). If instead the system is operating during a particular national or public holiday (e.g., Christmas day), a good choice for the reference day could be a previous occurrence of such national or public holiday (e.g., the Christmas day of the previous year).

According to another embodiment of the present invention, the reference day may be instead a day (preceding in time the current day) during which the density of users and the flows thereof in the region of interest 107 has a statistical behavior which is substantially comparable to that of the current day. For example, the reference day may be chosen as a day during which a public happening took place in the past, e.g., a public happening similar to that which is expected to occur in the current day.

According to an embodiment of the present invention, the selection of the reference day is automatically carried out by the computation engine itself 110 by exploiting the historical data stored in the repository 115. According to an alternative embodiment of the present invention, the selection of the reference day may be instead manually carried out by one or more operators of the system 100.

In view of the above, the next phase of the procedure 200 provides for calculating a corresponding reference O-D matrix RM(t) using the network event records and GPS records stored in the repository 115 collected by the computation engine 110 during a reference time slot RTS(t) of such corresponding reference day corresponding to the observation time slot OTS(t) (block 240).

As illustrated hereinbelow, the generic element r(i,j) of the reference O-D matrix RM(t) represents the number of traffic flows starting in the area A(i) (origin area) and ending in the area A(j) (destination area) in the reference time slot RTS(t) of the corresponding reference day.

| RTS(t) | A(1)   | A(2)   | A(3)   |
|--------|--------|--------|--------|
| A(1)   | r(1, 1)| r(1, 2)| r(1, 3)|
| A(2)   | r(2, 1)| r(2, 2)| r(2, 3)|
| A(3)   | r(3, 1)| r(3, 2)| r(3, 3)|

According to another embodiment of the present invention, the reference O-D matrix RM(t) can be generated by calculating an average of the data obtained through network event records and/or GPS records collected in reference time slots RTS(t) of more than one standard, reference day.

According to a further embodiment of the present invention, the reference O-D matrix RM(t) can be generated also by classifying the behavior of the traffic flows in "cluster", wherein each cluster corresponds to specific groups of days during which the traffic flows has been observed having similar features.

The next phase of the procedure 200 according to an embodiment of the present invention (block 250) provides for calculating the difference D between the number of traffic flows moving from the external area A(3) to the intermediate area A(2) during the considered observation time slot OTS(t) and the number of traffic flows moving from the external area A(3) to the intermediate area A(2) during the reference time slot RTS(t) of the reference day, i.e.:

$$D = m(3,2) - r(3,2) \qquad (1).$$

m(3,2) represents the number of flows from the external area A(3) to the intermediate area A(2); this number comprises both flows of user terminals who are moving from the external area A(3) to the intermediate area A(2) to specifically reach the target area A(1) for attending the public happening, and flows of user terminals who are moving from A(3) to A(2) for other reasons. By subtracting from m(3,2) the number of flows r(3,2) from the external area A(3) to the intermediate area A(2) during the reference day (i.e., during a standard day without the public happening), the contribution to the number of traffic flows from A(3) to A(2) due to user terminals who are not moving because of the public happening is advantageously removed. In this way, the stochastic process corresponding to element m(3,2) of the O-D matrix M(t) is rendered quasi-stationary, and suitable to be subjected to a predictive procedure.

According to an embodiment of the present invention, the difference D is used in the following phase (block 260) to predict the actual number of new user terminals (and therefore users) who will enter in the target area A(1) for attending the public happening in a forthcoming period subsequent to the considered observation time slot OTS(t). According to an embodiment of the present invention, the number of new user terminals (and therefore users) who will enter in the target area A(1) for attending the public happening in a certain time t is predicted to be equal to the value of D calculated at a previous time t-T, wherein T is a time delay interval which may depend on several factors, such as the geographic topology of the region of interest 107 and/or the kind of transportations available in such region of interest 107. In other words, according to this embodiment of the invention, the flows of user terminals who are moving from the external area A(3) to the intermediate area A(2) (to specifically reach the target area A(1) for attending the public happening) given by the difference D anticipate the flows of the same user terminals who will move then from the intermediate area A(2) to the target area A(1) by a time interval corresponding to T.

Figure 3:
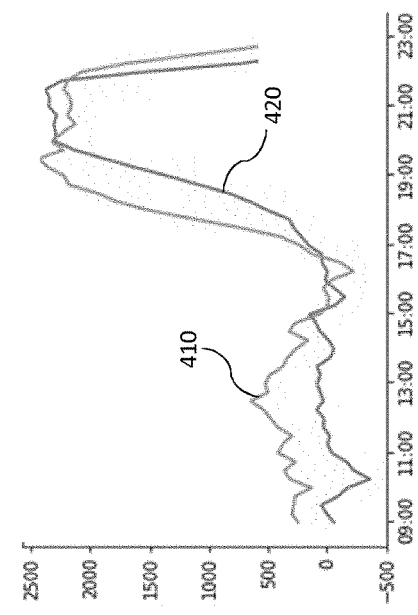
FIG. 3 is a time diagram showing how the cumulative graph of the flows of user terminals from an external area to an intermediate area of the region of interest anticipates the cumulative graph of the flows of user terminals from the intermediate area to a target area of the region of interest wherein a public happening is occurring.

This can be seen by considering the exemplary time diagram illustrated in FIG. 3. This example relates to measures taken on a percentage (around 30%) of people which were moving toward an indoor stadium having a capacity of 10000 for attending to a public happening (particularly, a music concert) in a spring weekday of year 2017. The target area A(1) comprises cells of the communication networks having a center comprised within a radius of 400 meter from the indoor stadium, and the intermediate area A(2) has a radius of 3500 meters. Such time diagram, in which the horizontal axis corresponds to time and the vertical axis corresponds to people amount, shows that the cumulative amount 310 of the flows of user terminals from the external area A(3) to the intermediate area A(2) to specifically reach the target area A(1) for attending the public happening anticipates the cumulative amount 320 of the flows of user terminals from the intermediate area A(2) to the target area A(1) by a corresponding time delay interval T which is substantially constant. Looking at the time diagram illustrated in FIG. 3, it could be seen that the people amount which on the whole moved from the external area A(3) to the intermediate area A(2) (end portion of cumulative amount 310) is different from the people amount which on the whole moved from the intermediate area A(2) to the target area A(1) (end portion of cumulative amount 320). This is because of people who did not go to the public happening in the target area A(1), but stayed in the intermediate area A(2), and/or because of people who started their movement directly from the intermediate area A(2).

According to an embodiment of the present invention, the computation engine 110 is thus configured to calculate every observation time slot OTS(t) a prediction of the number of new user terminals which will be accumulated in the target area A(1) until time t+T based on the difference D calculated using the O-D matrix M(t), and thus it is capable of predicting the number of user terminals which will be contained in the target area A(1) in a forthcoming period by summing to each other the number of new user terminal calculated in the various considered observation time slots OTS(t).

According to an embodiment of the present invention, the time delay interval T may be estimated by processing the path traversed by user terminals which were already present in the target area A(1) while attending the public happening. Particularly, according to this embodiment of the invention, the time delay interval T is set to the average delay between the time in which the transition from the external area A(3) to the intermediate area A(2) occurred and the time in which the entrance in the target area A(1) occurred.

Knowing in advance the number of user terminals which will be located in the target area A(1) can be advantageously used in several different scenarios to set up various services to be offered to users located in the target area A(1).

For example, an application scenario may provide for having the computation engine 110 that periodically sends the user terminal predictions to a management system (not illustrated) of the wireless communication network 105. In this way, the management system is allowed to configure the wireless communication network 105 (e.g., in terms of radio resource availability) in advance for efficiently face the increase of user terminals in the target area A(1) in a way that is proportional to the actual increase of user terminals.

Another application scenario may provide for having the computation engine 110 that automatically alerts a public security system to intervene for safeguarding the target area A(1) in a way that is proportional to the actual increase of user terminals (and therefore of users). For example, police, guards or patrols may be sent toward the target area A(1) in advance for controlling and/or limiting the user traffic.

A still further application scenario may provide for exploiting the predictions of the computation engine 110 for strengthening and/integrating the public transportation system from/to the target area A(1) in a way that is proportional to the actual increase of user terminals (and therefore of users).

While in the traffic analysis procedure 200 described above the actual number of new user terminals who will enter in the target area A(1) for attending the public happening is predicted based on the difference D=m(3,2)−r(3,2), i.e., by considering only the number of traffic flows from the external area A(3) to the intermediate area A(2), according to an alternative embodiment of the present invention, the concepts of the present invention can be applied also in case, in addition to the number of traffic flows from the external area A(3) to the intermediate area A(2), also the number of traffic flows from the external area A(3) to the target area A(1) are considered. In this case, in addition to use element m(3,2) of the O-D matrix M(t) and element r(3,2) of the reference O-D matrix RM(t), also element m(3,1) of the O-D matrix M(t) and element r(3,1) of the reference O-D matrix RM(t) are used.

The traffic analysis procedure 200 described above is sensitive to user density differences in the intermediate area A(2) between the observation time slot OTS(t) of the current day and reference time slot RTS(t) of the reference day. These differences may be caused by the presence of fake movements which are not caused by real user movements. For example, the esteemed position of a user terminal may be affected by relevant errors both in case network events tracking with relative serving cells are used, and in case of MDT procedures carried out with signal level measurements. These errors may translate into fake movements of stationary user terminals. This drawback is more significant in case the user tracking is based on the sequence of cells used by the user terminal. Indeed, because of traffic/quality of service/interference balancing reasons, the wireless communication network 105 may force the user terminal to be served by different neighboring cells 105b even if the user terminal is not moving. When these different neighboring cells 105b that can serve a user terminal belong to different areas A(1), A(2), A(3), fake random movements arise which do not correspond to any real user terminal traffic flow. These fake movements tend to compensate themselves in subsequent time periods when static user terminals will be again served by a same cell 105b while moving user terminals will be served by a different cell 105b. However, since the O-D matrices M(t) are calculated in real-time, these fake movements overlap to the contributions generated by user terminal who are actually moving among the different areas A(1), A(2), A(3).

Making reference to the exemplary time diagram illustrated in FIG. 3, this drawback causes an overestimation of the traffic flows which are accessing to the areas, especially the one from the external area A(3) to the intermediate area A(2), because the extension of the border between the external area A(3) and the intermediate area A(2) is the larger one.

Applicant has observed that since said fake movements are periodic, they will tend to arise both as movements from an area A(i) to an area A(j), and also movements in the opposite direction from the area A(j) to the area A(i). Indeed, a fake movement of a static user terminal from area A(i) to area A(j) at time t will statistically correspond to an opposite movement from area A(j) to area A(i) by another or the same static user terminal in a subsequent time t' when the conditions which caused such fake movement are ceased.

For this reason, according to another embodiment of the present invention, the noise due to the abovementioned fake movements is reduced by modifying equation (1) used at block 250, which involves only traffic flows moving from the external area A(3) to the intermediate area A(2), in order to take into consideration also the traffic flows going in the opposite direction, i.e., from the intermediate area A(2) to the external area A(3). More particularly, according to an embodiment of the present invention, instead of the abovementioned difference D, another difference D' is calculated between:

a first term m equal to the difference between the number of flows m(3,2) moving from the external area A(3) to the intermediate area A(2) during the considered observation time slot OTS(t) of the current day and the number of flows m(2,3) moving from the external area A(3) to the intermediate area A(2) during the considered observation time slot OTS(t) of the current day, and a second term r equal to the difference between the number of flows r(3,2) moving from the external area A(3) to the intermediate area A(2) during the reference time slot RTS(t) of the reference day and the number of flows m(2,3) moving from the external area A(3) to the intermediate area A(2) during the reference time slot RTS(t) of the reference day.

In other words, the difference D' is thus $$D'=m-r=[m(3,2)-m(2,3)]-[r(3,2)-r(2,3)], \quad (2)$$

wherein m is referred to as "net number of flows during observation time slot OTS(t) of the current day" and r is referred to as "net number of flows during the reference time slot RTS(t) of the reference day". By using the difference D' of equation (2) instead of the difference D of equation (1), the noise caused by the abovementioned fake movements is reduced, and the prediction of actual number of new user terminals (and therefore users) who will enter in the target area A(1) for attending the public happening in a forthcoming period subsequent to the considered observation time slot OTS(t) is thus improved.

According to an embodiment of the present invention, the noise due to fake movements may be also reduced if in addition to or in place of using the difference D' relating to the net number of flows, or of using the difference D, proper static user terminals filtering techniques are used. Specific Call Detail Record (CDR) processing calculations may be also used for obtaining a statistical estimation of the contribution on the O-D matrixes due to the fake movements.

Figure 4:
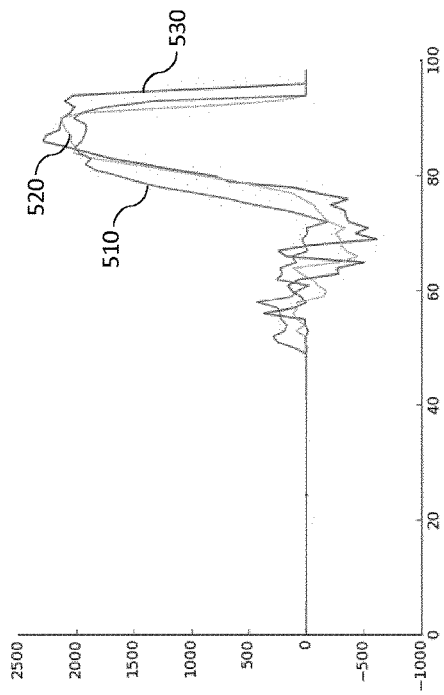
FIG. 4 is a time diagram showing the net cumulative graph of the flows of user terminals from the external area to the intermediate area to specifically reach the target area, and the net cumulative graph of the flows of user terminals from the intermediate area to the target area.

In order to show an example in which the difference D' is used instead of the difference D, reference will be now made to the exemplary time diagram illustrated in FIG. 4. The exemplary time diagram illustrated in FIG. 4, in which the horizontal axis corresponds to time and the vertical axis corresponds to people amount, shows the net (i.e., entries minus exits) cumulative amount 410 of the flows of user terminals from the external area A(3) to the intermediate area A(2) to specifically reach the target area A(1) for attending the public happening and the net (i.e., entries minus exits) cumulative amount 420 of the flows of user terminals from the intermediate area A(2) to the target area A(1). The cumulative amount 420 follows the cumulative amount 410 with a substantially constant delay equal to the time delay interval T.

As already mentioned for the case in which the difference D is used, the net cumulative graph 410 may be therefore used for understanding if the net cumulative graph 420 will increase again in the near future, and the amount of such increasing.

From FIG. 4 it can be observed that a strong correlation exists between the second derivatives of the cumulative graphs 410 and 420. Since the measures are affected by noise, in order to be capable of discerning such second derivative variations, the cumulative graphs should be interpolated. The correlation between the second derivatives of the cumulative graphs may be also used for estimating the time delay interval T.

According to an embodiment of the present invention, the size (e.g., the radius) of the external area A(3) may be varied in such a way to vary the time delay interval T, and therefore in such a way to vary the time advance of the traffic flow prediction. The smaller the external area A(3), the lower the time delay interval T, but the higher the precision of the prediction.

In the same way as for the prediction previously described based on the difference D, similar considerations apply even if for the calculation of the difference D' in addition to the net number of traffic flows from the external area A(3) to the intermediate area A(2), also the net number of traffic flows from the external area A(3) to the target area A(1) are considered. In this case, in addition to use elements m(3,2), m(2,3) of the O-D matrix M(t) and elements r(3,2), r(2,3) of the reference O-D matrix RM(t), also elements m(3,1), m(1,3) of the O-D matrix M(t) and elements r(3,1), r(1, 3) of the reference O-D matrix RM(t) are used.

Figure 5:
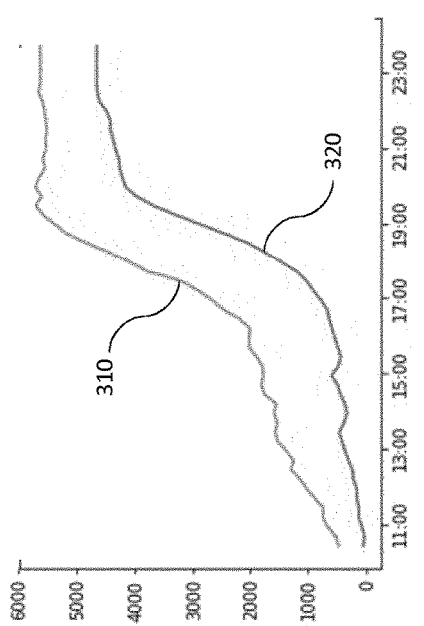
FIG. 5 is a time diagram showing an example of the prediction accuracy obtainable with the system of FIG. 1 according to the embodiment of the present invention.

The exemplary time diagram illustrated in FIG. 5 shows an example of the prediction accuracy obtainable with the system 100 according to the embodiment of the present invention. This time diagram, in which the horizontal axis corresponds to time and the vertical axis corresponds to people amount registered by the system when network events occur, shows the measured net (i.e., entries minus exits) number 510 of flows of user terminals from the external area A(3) to the intermediate area A(2) to specifically reach the target area A(1) for attending the public happening, the measured net (i.e., entries minus exits) number 520 of flows of user terminals from the intermediate area A(2) to the target area A(1), and the predicted net (i.e., entries minus exits) number 530 of flows of user terminals from the intermediate area A(2) to the target area A(1).

According to an embodiment of the present invention, in order to increase the prediction accuracy, the number of flows from the external area A(3) to the intermediate area A(2) may be filtered. Such filtering introduces a delay, particularly a delay equal to a measure interval if it is desired to average the current sample with the previous and the subsequent one.

According to an embodiment of the present invention in order to further increase the prediction accuracy, the number of flows from the external area A(3) to the intermediate area A(2) may be filtered by excluding flows due to user terminals that usually attend the intermediate area A(2) (i.e. users terminals that have their home or workplace in the intermediate area A(2)). This can be made by observing the behavior of the user terminals in the days prior to the public happening. For example, user terminals corresponding to users which lived in the intermediate area A(2) during week, or which work in the intermediate area A(2) during a relevant part of the days before the public happening may be advantageously excluded from the counting.

According to an embodiment of the present invention, in order to improve the robustness of the system 100 against random perturbations on the user terminals distribution with respect to the reference day, cells 105b having a number of user terminals which is very different from the number of user terminals in the reference day may be advantageously excluded from the intermediate area A(2) because the access to these cells is anomalous with respect to the reference day, and it is such to introduce errors on the measures on the number of flows directed to the public happening.

According to an embodiment of the present invention, cells 105b which in theory should belong to the external area A(3) but are located on fast route zones (such as cells 105b located along subway or railway lines) may be advantageously included in the intermediate area A(2) and excluded from the external area A(3) based on geometrical and access speed considerations.

According to an embodiment of the present invention, a prediction is also made about users who are leaving the public happening. Specifically, an average public happening attendance time is calculated by estimating the time period during which network event records and/or GPS records have been collected when the corresponding user terminals were located in the target area A(1). Said calculated attendance time may be used for forecasting the public happening leaving rate.

In order to increase the reliability of the average public happening attendance time, the calculation thereof may be carried out only on user terminals belonging to users who are going to the public happening and excluding the other ones. This can be made by observing the behavior of the user terminals in the previous days or weeks. Therefore, the average public happening time will be applied only to the portion of user terminals that have been assessed to be in the target area A(1) for attending the public happening.

The invention claimed is:

1. A method, implemented by a system coupled with a wireless communication network, comprising predicting a number of users of user terminals gathering in a target area within a region of interest for attending a public happening occurring in a first day, said region of interest being under radio coverage by said wireless communication network, said predicting comprising performing the following operations during said first day:
   collecting, from the wireless communication network, records relating to user terminals positioning data;
   partitioning a portion of the region of interest into an intermediate area surrounding the target area and into an external area which surrounds the intermediate area;
   for each observation time slot of a plurality of observation time slots of said first day, calculating a first term indicative of the number of user terminals which are moving from the external area to the intermediate area during said observation time slot based on the collected records;
   for each observation time slot, calculating a second term indicative of the number of user terminals which, during a corresponding reference time slot of a reference day preceding in time said first day, moved from the external area to the intermediate area, said calculating the second term being based on records which were collected during said reference day,
   for each observation time slot, calculating the difference between said first term and said second term;
   for each observation time slot, predicting the number of new user terminals which will enter in the target area for attending the public happening in a forthcoming period subsequent to said observation time slot based on said calculated difference.

2. The method of claim 1, wherein said collecting, from the wireless communication network, records relating to user terminals positioning data comprises collecting at least one between network events records and GNSS records, each network event record providing geographical position data of a user terminal involved in a corresponding network event, each GNSS record containing GNSS position of a user terminal.

3. The method of claim 1, wherein said calculating the difference comprises calculating the difference between:
   a first term indicative of the number of user terminals which are moving from the external area to the intermediate area minus the number of user terminals which are moving from the intermediate area to the external area during said observation time slot based on the collected records;
   a second term indicative of the number of user terminals which moved from the external area to the intermediate area minus the number of user terminals which moved from the intermediate area to the external area during said reference time slot of the reference day.

4. The method of claim 2, wherein each network event is an interaction between a user terminal and the wireless communication network, said interaction comprising at least one among:
   an interaction at power on/off of the user terminal;
   an interaction at incoming/outgoing voice calls;
   an interaction at sending/receiving SMS from/o the user terminal;
   an interaction at Internet access by the user terminal;
   an interaction at a generic data transfer between the user terminal and the wireless communication network.

5. The method of claim 1, wherein said reference day is a day during which the density of users and the flows thereof in the region of interest had a statistical behavior similar to that expected for the first day deprived of contributions due to the public happening occurrence.

6. The method of claim 1, wherein said reference day is a day during which the density of users and the flows thereof in the region of interest is substantially comparable to that expected for the first day.

7. The method of claim 1, further comprising:
   calculating an average public happening attendance time by estimating the time period during which records have been collected when the corresponding user terminals were located in the target area;
   forecasting a public happening leaving rate based on said calculated public happening attendance time.

8. The method according to claim 1, further comprising setting up services to be provided to users in the target area based on said predicted number of users.

9. The method of claim 8, wherein said setting up services to be provided to users in the target area comprises at least one among:
   configuring the wireless communication network in terms of radio resource availability in a way that is proportional to said predicted number of users;
   alerting a public security system to intervene for safeguarding the target area in a way that is proportional to said predicted number of users; and
   strengthening a public transportation system from/to the target area in a way that is proportional to said predicted number of users.

10. A system coupled with a wireless communication network (105), comprising a computation engine unit configured to predict the number of users of user terminals gathering in a target area within a region of interest for attending a public happening occurring in a first day, said region of interest being under radio coverage by said wireless communication network, said computation engine being configured to carry out the following operations during said first day:
   collecting, from the wireless communication network, records relating to user terminals positioning
   partitioning a portion of the region of interest into an intermediate area surrounding the target area and into an external area which surrounds the intermediate area;
   for each observation time slot of a plurality of observation time slots of said first day, calculating a first term indicative of the number of user terminals which are moving from the external area to the intermediate area during said observation time slot based on the collected records;
   for each observation time slot, calculating a second term indicative of the number of user terminals which, during a corresponding reference time slot of a reference day preceding in time said first day, moved from the external area to the intermediate area, said calculating the second term being based on records which were collected during said reference day, for each observation time slot, calculating the difference between said first term and said second term;

for each observation time slot, predicting the number of new user terminals which will enter in the target area for attending the public happening in a forthcoming period subsequent to said observation time slot based on said calculated difference.

11. The system of claim 10, further comprising a repository unit configured to memorize the records collected during the first day and during the reference day.

* * * * *